(12) United States Patent
Hirano et al.

(10) Patent No.: US 8,056,783 B2
(45) Date of Patent: Nov. 15, 2011

(54) EXTERIOR MEMBER MOUNTING UNIT

(75) Inventors: Yoichi Hirano, Hiroshima (JP);
Mamoru Morita, Hiroshima (JP);
Takeo Matsui, Hiroshima (JP);
Nobuyuki Takahashi, Hiroshima (JP);
Haruo Miyake, Hiroshima (JP); Kenichi Hirata, Kasaoka (JP)

(73) Assignees: Nifco Inc., Kanagawa (JP); Mazda Motor Corporation, Hiroshima (JP); Katayama Kogyo Co., Ltd., Okayama (JP)

( * ) Notice: Subject to any disclaimer, the term of this patent is extended or adjusted under 35 U.S.C. 154(b) by 1254 days.

(21) Appl. No.: 11/216,056

(22) Filed: Sep. 1, 2005

(65) Prior Publication Data
US 2006/0049322 A1 Mar. 9, 2006

(30) Foreign Application Priority Data
Sep. 6, 2004 (JP) .................................. 2004-258271

(51) Int. Cl.
*B60R 9/04* (2006.01)
(52) U.S. Cl. .......................... 224/326; 224/309; 296/37.7
(58) Field of Classification Search .................... 52/202, 52/204.62, 204.69; 296/37.7, 178; 224/309, 224/326
See application file for complete search history.

(56) References Cited

U.S. PATENT DOCUMENTS

| | | | | |
|---|---|---|---|---|
| 3,325,067 A * | 6/1967 | Helm | .............................. | 224/321 |
| 4,139,971 A * | 2/1979 | Kimura | ............................ | 52/208 |
| 4,349,993 A * | 9/1982 | Tanaka et al. | .................... | 52/208 |
| 4,372,469 A * | 2/1983 | Kowalski et al. | ............. | 224/321 |
| 4,473,178 A * | 9/1984 | Bott | ............................... | 224/324 |
| 4,767,040 A * | 8/1988 | Miller et al. | ................... | 224/326 |
| 4,911,349 A * | 3/1990 | Miller | ............................ | 224/326 |
| 5,201,487 A * | 4/1993 | Epplett | ...................... | 248/298.1 |
| 5,275,320 A * | 1/1994 | Duemmler | ..................... | 224/319 |
| 5,347,775 A * | 9/1994 | Santos | ............................ | 52/202 |
| 5,584,462 A * | 12/1996 | Reese | ........................... | 248/477 |
| 5,782,392 A * | 7/1998 | Yamamoto | .................... | 224/326 |
| 5,931,359 A * | 8/1999 | Zona | ............................. | 224/321 |
| 5,934,636 A * | 8/1999 | Cyrell | .......................... | 248/246 |
| 5,954,251 A * | 9/1999 | Tress et al. | ..................... | 224/309 |
| 5,975,391 A * | 11/1999 | Aftanas et al. | ................ | 224/309 |
| 6,003,825 A * | 12/1999 | Abernathy, Jr. | ............... | 248/478 |
| 6,082,879 A * | 7/2000 | Myburgh | ...................... | 362/480 |
| 6,101,771 A * | 8/2000 | Aikens | ............................ | 52/202 |
| 6,131,354 A * | 10/2000 | Thompson | ..................... | 52/511 |
| 6,305,589 B1 * | 10/2001 | Chimenti et al. | ............. | 224/321 |
| 6,311,882 B1 * | 11/2001 | Allison et al. | ................ | 224/326 |
| 6,485,078 B1 * | 11/2002 | Lim | ............................... | 296/37.7 |
| 7,077,373 B1 * | 7/2006 | Hoebener et al. | .......... | 248/278.1 |

FOREIGN PATENT DOCUMENTS

| | | |
|---|---|---|
| DE | 10356382 A1 | 7/2005 |
| JP | 11-034749 | 2/1999 |
| JP | 11034749 A | 2/1999 |
| JP | 2001-328492 | 11/2001 |
| JP | 2001328492 A | 11/2001 |
| JP | 2002193050 A | 7/2002 |

* cited by examiner

Primary Examiner — Eileen D Lillis
Assistant Examiner — Chi Nguyen
(74) Attorney, Agent, or Firm — Manabu Kanesaka

(57) ABSTRACT

An exterior member mounting unit is used for installing an exterior member to a device, such as a vehicle roof. The mounting unit includes a first part detachably supporting the exterior member so that an upper surface thereof is covered by the exterior member, a second part detachably held by the first part, and a screw for attaching the exterior member to the device while utilizing the second part detachably supported by the first part as a seating plate.

10 Claims, 14 Drawing Sheets

EXTERIOR MEMBER MOUNTING UNIT

BACKGROUND OF THE INVENTION AND RELATED ART STATEMENT

The present invention relates to an exterior member mounting unit, such as a molding, on a roof.

Some vehicle roofs are provided with roof channels formed to extend longitudinally on both sides of the roof, and such roof channels are covered with exterior members such as moldings. In such cases, brackets are generally mounted in the bottoms of the roof channels and the exterior members are mounted on the brackets via clips as disclosed in patent reference 1.

Patent reference 1: Japanese Unexamined Patent Publication No. 2001-328492

In the installation of the exterior members described above, however, since the exterior members eventually cover the openings of the roof channel openings, the brackets must be mounted to the roof channel bottoms (a fastening operation involving bolts) before mounting the exterior members to the brackets via clips to thereby cover the openings of the roof channels. That is, the mounting of the brackets and the mounting of the exterior members are separate and independent operations. More specifically, the following steps are required: (i) arranging the brackets on the roof channel bottoms, (ii) inserting the bolts through the brackets and the roof groove bottoms (through holes), (iii) screw-tightening nuts onto the bolts (bracket fastening operation), and (iv) installing the exterior members with the clips installed therein in advance to the brackets utilizing said clips. This situation is not necessarily acceptable, as the assembly steps required for these operations for mounting exterior members to a roof are many rather than few.

The present invention has been proposed in view of the above situation, and a first object of the present invention is to provide an exterior member mounting unit capable of increasing the efficiency in the operations of mounting exterior members to a vehicle roof.

A second object of the present invention is to provide an exterior member mounting structure utilizing the aforementioned exterior member mounting unit.

A third object of the present invention is to provide a method for using the aforementioned exterior member mounting unit.

SUMMARY OF THE INVENTION

In order to achieve the first objective, the exterior member mounting unit for mounting a long exterior member to a roof according to the present invention (invention in a first aspect) comprises a first part detachably supporting said exterior member, the upper surface thereof being covered by said exterior member, a second part detachably supporting said first part, and a screw detachably supported by said first part to mount said exterior member to the roof by utilizing said second part as a facing plate. Preferred embodiments of the invention in the first aspect are as described in the second to tenth aspects.

In order to achieve the second objective, the exterior member mounting structure is arranged that the exterior member covers the vehicle roof channels, wherein according to the present invention (invention in an eleventh aspect), a through hole is formed in a predetermined location on the bottom of said roof channel; an exterior member mounting unit is arranged between said exterior member and said roof channel bottom in the location where said through hole exists; said exterior member mounting unit comprises a first part detachably supporting said exterior member, the upper surface thereof being covered by said exterior member, a second part detachably supported by said first part, and a screw detachably attached to said first part to mount said exterior member to the roof by utilizing said second part as a facing plate, said screw being inserted into said through hole and a nut being screwed onto said screw from the inner side of the roof. Preferred embodiments of the invention in the eleventh aspect are as described in twelfth to fourteenth aspects.

In order to achieve the third objective, the method for using the exterior member mounting structure according to the present invention (fifteenth aspect) comprises the steps of preparing an exterior member mounting unit, which comprises a first part detachably supporting an exterior member, the upper surface thereof being covered by said exterior member, a second part detachably supported by said first part, and a screw detachably attached to said first part to utilize said second part as a facing or seating plate, supporting the first part of said exterior member mounting unit in the exterior member, inserting the screw of the mounting unit supported in the exterior member into the through hole of a roof formed in advance, and screwing a nut onto said screw from the inner side of said roof.

In order to achieve the third objective, the method for using the exterior member mounting structure according to the present invention (invention in sixteenth aspect) comprises the steps of preparing an exterior member mounting unit, which comprises an exterior member, a first part detachably supported by said exterior member, the upper surface thereof being covered by said exterior member, a second part detachably supported by said first part, and a screw detachably supported by said first part and utilizing said second part as a seating plate, inserting the screw of said mounting unit into the through hole of a vehicle roof formed in advance, and screwing a nut onto said screw from the inner side of said roof.

According to the invention described in the first aspect, the mounting unit includes the first part detachably supporting said exterior member, the upper surface thereof being covered by said exterior member, the second part detachably supported by said first part, and the screw detachably supported by said first part to mount said exterior member to the roof by utilizing said second part as a facing plate. Thus, the exterior member can be mounted on the roof via the exterior member mounting unit simply by screwing a nut onto the screw from the inner surface of the roof upon attaching the first part of the exterior member mounting unit to the exterior member and inserting the screw of the exterior member mounting unit into the hole formed in the roof in advance. The use of the exterior member mounting unit makes it possible to integrate, in advance, all members that are eventually fastened to the roof. In order to fasten the unit to the roof, it suffices to thread the screw of the unit into the roof (through hole) and screw-tighten the nut from the inner surface side of the roof. Thus, the efficiency in mounting the exterior member to the roof can be increased.

Moreover, the second part reinforces the first part, thereby increasing the strength (rigidity) of the exterior member mounting unit, and the use of the second part as the facing or seating plate ensures firm installation of the exterior member mounting unit to the roof.

According to the invention described in the second aspect, since the first part can slide against the exterior member in the longitudinal direction, it is unnecessary to fasten the exterior member mounting unit to the exterior member precisely in the predetermined mounting position. The exterior member mounting unit can be slid relative to the exterior member when mounting the exterior member to the roof, and the exterior member can be easily mounted on the roof in a proper condition. This eliminates the necessity of positioning the mounting unit relative to the exterior member, thereby increasing efficiency in the mounting operation of the exterior member to the roof.

According to the invention described in the third aspect, on the assumption that the exterior member has a top plate extending longitudinally and a pair of curved sections disposed longitudinally on both sides of said top plate so as to enclose said sides, engaging means for engaging said pair of curved sections are disposed on both longitudinal sides of said first part so as to expand and contract. Accordingly, the first part can be supported within the pair of curved sections and supported slidably against the pair of curved sections upon fitting the first part into the pair of curved sections. Thus, a specific embodiment of the exterior member mounting unit disclosed in the second aspect can be offered.

According to the invention described in the fourth aspect, the first part includes a main first part body that is a strip of plate, the second part includes a main second part body that is a strip extending along the lower surface of said first part, and the screw extends downwardly from the lower surface of said main second part body. Accordingly, when the exterior member mounting unit is attached to the exterior member, the main bodies of both the first and second parts fill the inner space of the exterior member in a layered condition across the entire lengths, thereby effectively reinforcing the exterior member in a relatively long region in which the exterior member mounting unit is present. Therefore, deformation of the exterior member attributable to external force can be effectively prevented by utilizing the shape and strength of the exterior member mounting unit.

According to the invention described in the fifth aspect, the main first part body is provided with an insertion hole, wherein one end of the main second part body is supported by the insertion hole, and the section on the other end of said main second part body is fastened against the lower surface of said main first part body. This naturally allows for the integration of the first part and the second part. Moreover, one end of the main second part body can be supported simply by forming an insertion hole in the main first part body and inserting the end of the main second part body, thereby eliminating the necessity for specially providing mounting means for the main first part body to support the main second body. Thus, the number of parts can be reduced.

According to the invention described in the sixth aspect, the first part is provided with an insertion hole, one section of the second part is mated with and supported by said insertion hole, the other section of the second part is extended away from the first part, and the screw is integrally disposed in said other section of the second part. This not only achieves the same effects as those of the invention in the first aspect, but also reduces the number of parts, as the main second part body is supported by the main first part body without having to specially prepare a mounting means.

According to the invention described in the seventh aspect, the main first part body is provided with an opening to expose one portion of the main second part body, and the main second part body is provided with a mounting section disposed so as to face said opening for mounting a member that is to be fastened subsequently. The use of the exterior member mounting unit allows not only for the installation of an exterior member to a roof, but also for an easy installation of a subsequently mounted member, such as a roof carrier, provided that an opening is created in the exterior member. The plate-shaped first and second parts of the exterior member mounting unit are arranged on the roof channel bottom in a layered condition. This can increase the substantial thickness and the strength of the unit over a relatively large region in the vicinity of a section where the load of a subsequently mounted member is received. Accordingly, the unit can demonstrate a sufficient level of strength relative to the load applied by the subsequently mounted member, and can be offered as a highly reliable mounting unit for a member that is to be mounted subsequently.

According to the invention described in the eighth aspect, the second part is provided with a mounting section for mounting a member that is to be fastened subsequently between one section of the second part and the screw. Thus, the mounting section of the second part can be exposed without specially creating an opening in the first part, and the member that is mounted subsequently can be mounted using the mounting section.

In addition, the other end side of the second part is positioned outside of the first part. Thus, the shape of the mounting section can be made more user friendly by bending the second part without allowing it to interfere with the first part.

According to the invention described in the ninth aspect, since the exterior member to be mounted on the roof is supported by the first part, the exterior member is a part of the exterior member mounting unit. Such an exterior member mounting unit can also achieve the same effects as those achieved by the first to eighth aspects.

According to the invention described in the tenth aspect, the first part is formed with a synthetic resin and the second part is formed with metal. Thus, the first part can be formed as a preferable part from the perspective of ensuring the characteristic of being detachably mounted to the exterior member, and the second part can be formed as a preferable part from the perspective of ensuring the strength of the exterior member mounting unit as a whole.

According to the invention described in the eleventh aspect, the through hole is formed in the predetermined location on the bottom of the roof channel, the exterior member mounting unit is arranged between the exterior member and the roof channel bottom in the location where said through hole exists, the exterior member mounting unit comprises the first part detachably supporting the exterior member, the upper surface thereof being covered by the exterior member, the second part detachably supported by the first part, and the screw detachably supported by the first part to mount the exterior member to the roof by utilizing the second part as a facing plate, the screw being inserted into said through hole and the nut being screwed onto the screw from the inner side of the roof. Thus, the exterior member mounting structure employing the mounting unit in the first aspect can be offered.

According to the invention described in the twelfth aspect, the first part includes a main first part body that is a strip of plate, the second part includes a main second part body that is a metal strip extending along the lower surface of the first part, and the screw extends toward the through hole from the plate surface of the main second part body. Accordingly, the main bodies of both the first and second parts fill up the inner space of the exterior member in a layered condition across the entire lengths, thereby effectively reinforcing the exterior member in a relatively long region in which the exterior member mounting unit (main bodies of the first and second parts) is present. Therefore, deformation of the exterior member attributable to external force can be effectively prevented by utilizing the shape and strength of the exterior member mounting unit.

According to the invention described in the thirteenth aspect, the main first part body is provided with an insertion hole, one end of the main second part body is retained in the insertion hole, and the section on the other end of the main second part body is fastened against the lower surface of the main first part body. This naturally allows for the integration of the first part and the second part. Moreover, one end of the main second part body can be supported simply by forming an insertion hole in the main first part body and inserting the end of the main second part body, thereby eliminating the necessity for specially providing mounting means for the main first part body to support the main second body. Thus, the number of parts can be reduced.

According to the invention described in the fourteenth aspect, the exterior member and the main first part body are each provided with an opening to expose one portion of the main second part body, and the main second part body is provided with a mounting section disposed so as to face both said openings for mounting a member that is to be fastened subsequently. This simplifies the mounting of a roof carrier or the like. In addition, the plate-shaped first and second parts are arranged on the roof channel bottom in a layered condition. This can increase the substantial thickness and the strength of the unit over a relatively large region in the vicinity of a section where the load of a subsequently mounted member is received. Accordingly, the unit can demonstrate a sufficient level of strength relative to the load applied by the subsequently mounted member, and can be offered as a highly reliable mounting unit for the member that is to be mounted subsequently.

According to the invention described in the fifteenth aspect, an exterior member can be mounted on the roof by preparing the exterior member mounting unit, which comprises the first part detachably supporting the exterior member, the upper surface thereof being covered by the exterior member, the second part detachably supported by said first part, and the screw detachably supported by the first part and utilizing the second part as a facing plate, and utilizing the unit. Thus, a method for using the exterior member mounting unit in the first aspect can be provided.

According to the invention described in the sixteenth aspect, the exterior member can be mounted on the roof by preparing the exterior member mounting unit, which comprises the exterior member, the first part detachably supporting the exterior member, the upper surface thereof being covered by the exterior member, the second part detachably supported by the first part, and the screw detachably supported by the first part and utilizing the second part as a facing plate, and utilizing the unit. Thus, a method for using the exterior member mounting unit in the ninth aspect can be provided.

DETAILED DESCRIPTION OF PREFERRED EMBODIMENTS

In the following, embodiments of the present invention will be explained based on the accompanying drawings.

Figure 1:
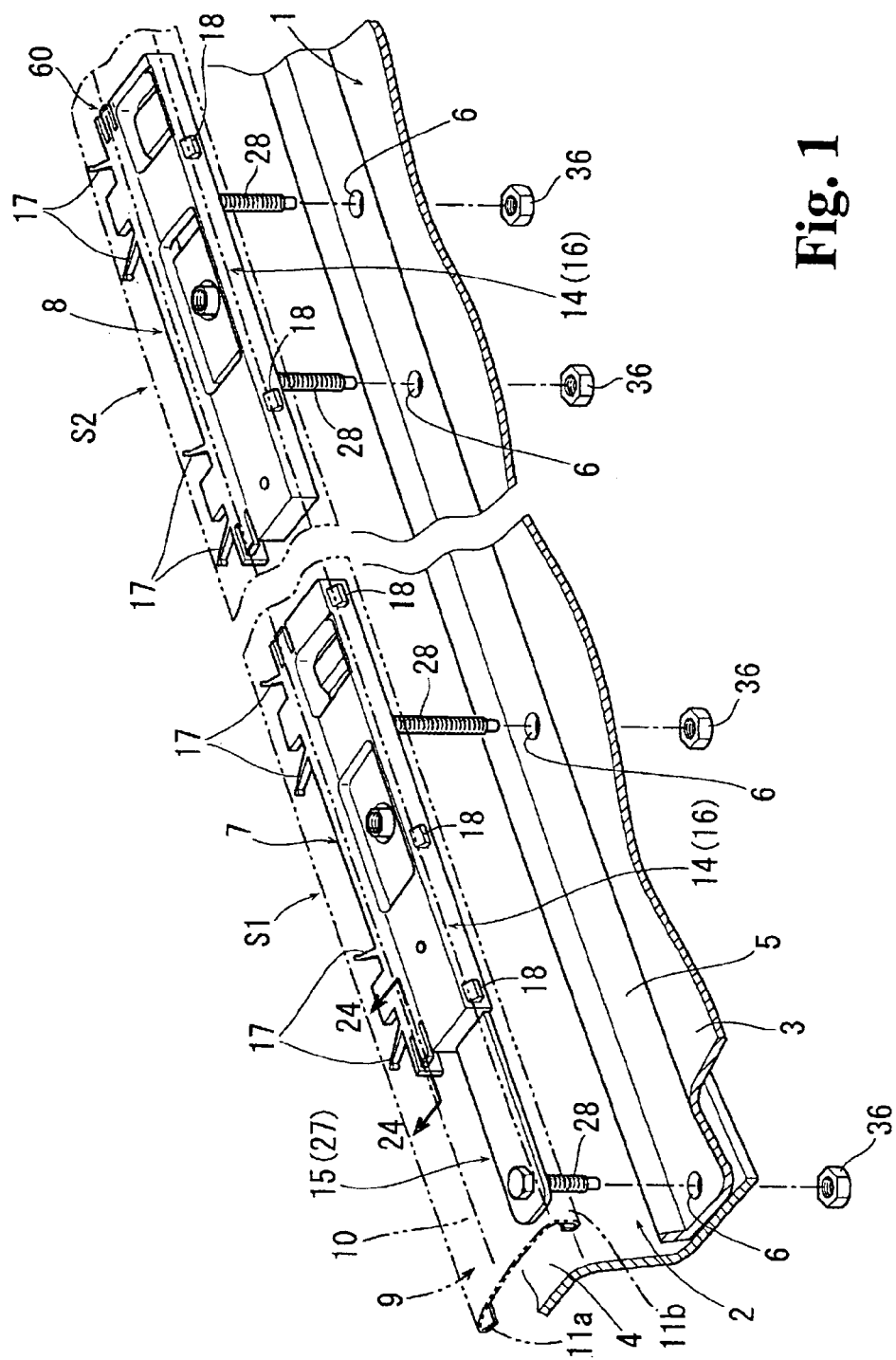
FIG. 1 is a diagram that explains the molding mounting structure in one embodiment of the present invention.
Figure 2:
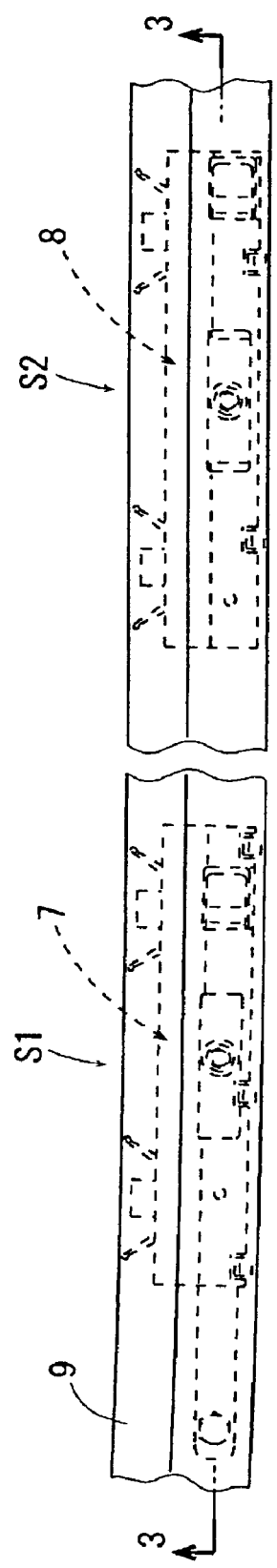
FIG. 2 is a plan view showing the molding mounting structure in the embodiment.
Figure 3:
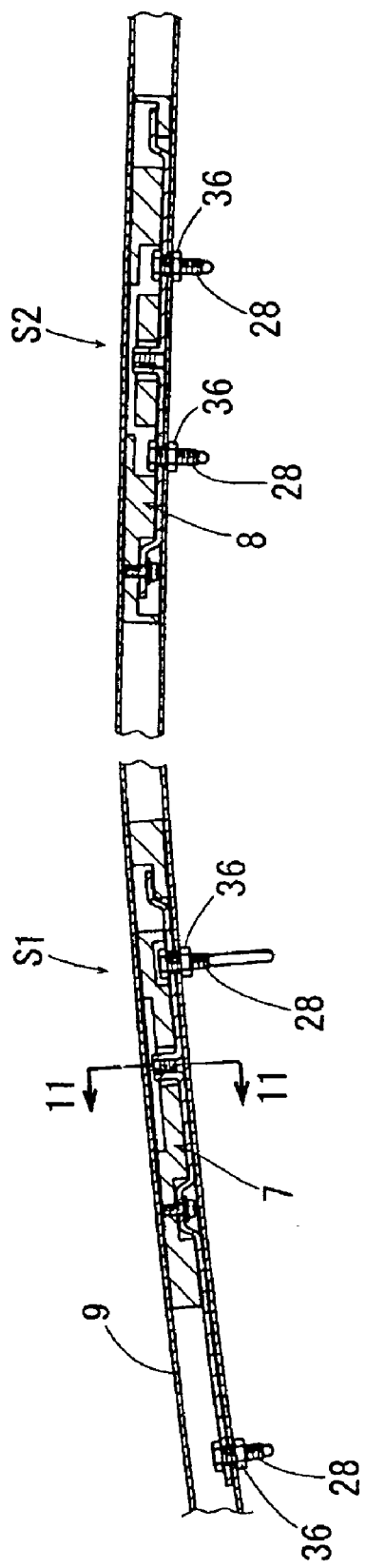
FIG. 3 is a sectional view of the same at line 3-3 indicated in FIG. 2.
Figure 4:
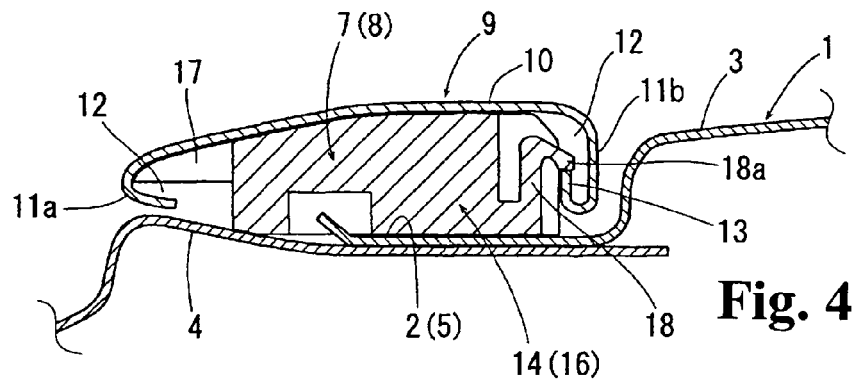
FIG. 4 is an enlarged longitudinal sectional view showing the molding mounting structure in the embodiment.

In FIG. 1, reference numeral 1 is a roof, and a roof channel 2 is formed on each side of the roof 1 so as to extend from the front to back of a vehicle (only one side is shown in FIG. 1). Each roof channel 2 is defined by a stepped edge section of the roof panel 3, which constitutes the roof 1, and a stepped edge section of the roof side panel 4, which also constitutes the roof 1. These edge sections are joined in a condition wherein one is laid on the other so as to form the bottom 5 of the roof channel 2. The roof channel 2, in this embodiment, has a relatively shallow channel-shaped cross section (see FIG. 4), and through holes 6 are formed in several installation locations S1 and S2 (only two locations are shown in FIG. 1-3) on the bottom 5. Each through hole 6 vertically extends through the roof 1, and each of the installation locations S1 and S2 is provided with a pair of through holes 6 that are spaced apart at a predetermined distance.

As shown in FIGS. 1-4, exterior member mounting units 7, 8 (hereinafter referred to as mounting units) are respectively disposed in the aforementioned installation locations S1 and S2 in the roof channel 2. In each mounting unit 7(8), a molding 9 is mounted as an exterior member.

As shown in FIGS. 1-4, the aforementioned molding 9 is formed as a long member in this embodiment, and the long molding 9 covers the upper opening of the roof channel 2. More specifically, the molding 9 includes a top plate 10 and a pair of curved sections 11a and 11b. The top plate 10 has a width that is substantially equal to or slightly smaller than the width of the roof channel 2, and extends in the direction in which the molding 9 extends to cover the upper opening of the roof channel 2. The pair of curved sections 11a and 11b similarly extends in the direction in which the molding 9 extends on both sides of the top plate 10. Each curved section 11a (11b) drops down from the top plate 10 towards the inner surface of the top plate 10 and is bent inward in the width direction of the top plate 10 to form, in conjunction with the top plate 10, a channel 12 that extends in the direction in which the top plate 10 extends. In the pair of the curved sections 11a and 11b, the curved section 11b arranged on the inner side of the roof 1, in particular, is further bent back towards the top plate 10 after it is bent inward in the width direction of the top plate 10 to form an engaging end 13 (see FIG. 4).

In this embodiment, the aforementioned installation locations S1 and S2 are such that the installation location S1 is positioned at the front side of a vehicle, and the installation location S2 is positioned at the rear side of the vehicle. In the mounting units, the mounting unit 7 is installed in the installation location S1 and the other mounting unit 8 is installed in the installation location S2.

Figure 5:
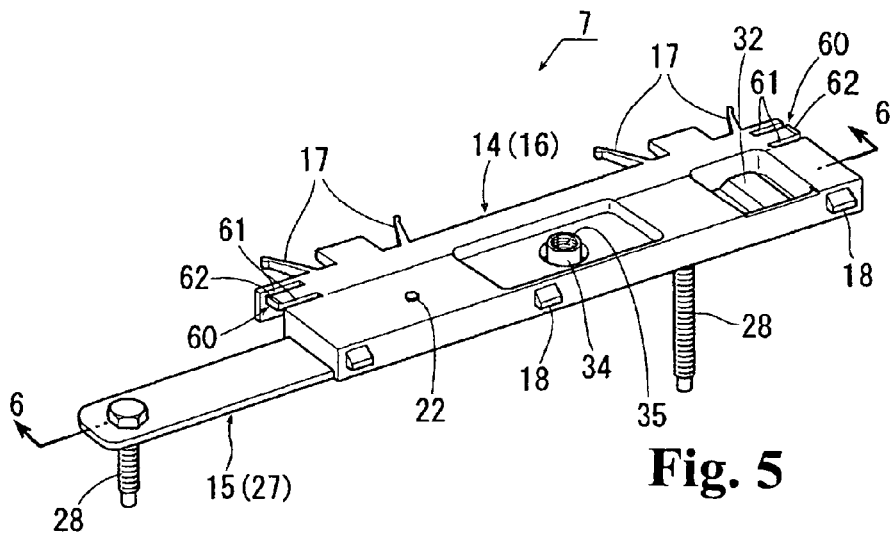
FIG. 5 is a perspective view showing one of the mounting units in the embodiment.
Figure 6:
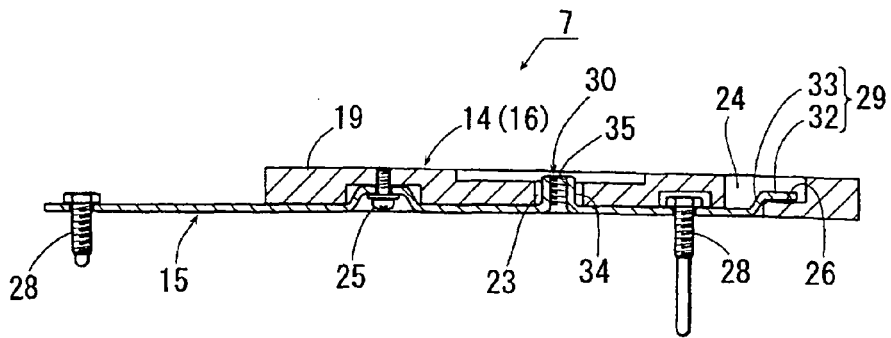
FIG. 6 is a sectional view of the same at line 6-6 indicated in FIG. 5.
Figure 7:
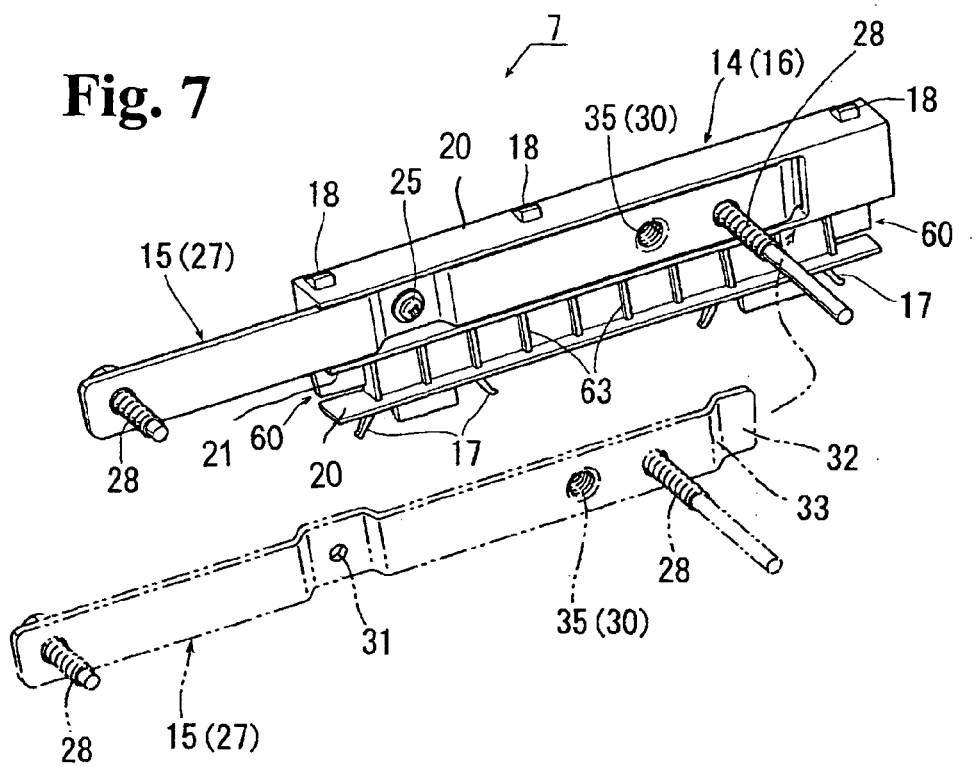
FIG. 7 is a perspective view showing the lower surface of the mounting unit.
Figure 9:
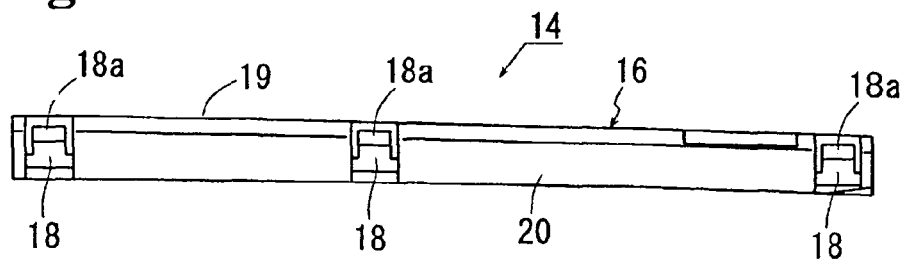
FIG. 9 is a front view of the clip shown in FIG. 8.
Figure 10:
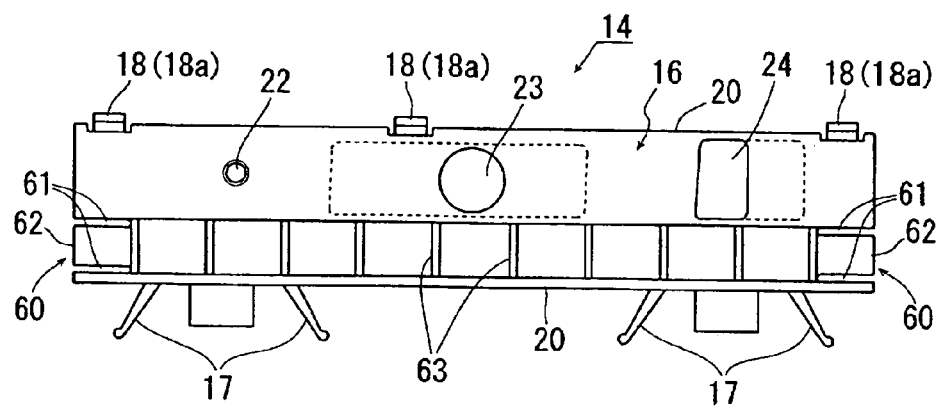
FIG. 10 is a bottom view of the clip shown in FIG. 8.

One of the mounting units, or mounting unit 7, will be explained first. The mounting unit 7, as shown in FIGS. 5-7, includes a clip 14 as a first part, a bracket 15 as a second part that is attached to the clip 14, and screws 28 integrally disposed in the bracket 15. The clip 14, as shown in FIGS. 8-10, comprises a main clip body 16 (a main first part body) extending as a strip of plate, two pairs of flexible pieces 17 disposed on one longitudinal side of the main clip body 16, and a plurality of engaging hooked tabs 18 as engaging means disposed on the other longitudinal side of the main clip body 16, all of which are integrally formed using synthetic resin.

The outer shape of the main clip body 16, as a strip of plate, is basically formed with an upper surface 19 and side walls 20 that drop down from both longitudinal sides of the top surface, and the strength of the main clip body 16 is ensured with a leg wall 21 that extends in the direction in which the main clip body 16 extends and drops down from the upper surface 19 between the two side walls 20 and a plurality of reinforcing ribs 63 bridging between the leg wall 21 and the side walls 20 (some are not shown). Thus, the lower surface of the main clip body 16 can be placed stably on the roof channel bottom 5, and the main clip body 16 does not easily deform when an external force is applied from the upper surface 19 towards the lower surface.

Figure 8:
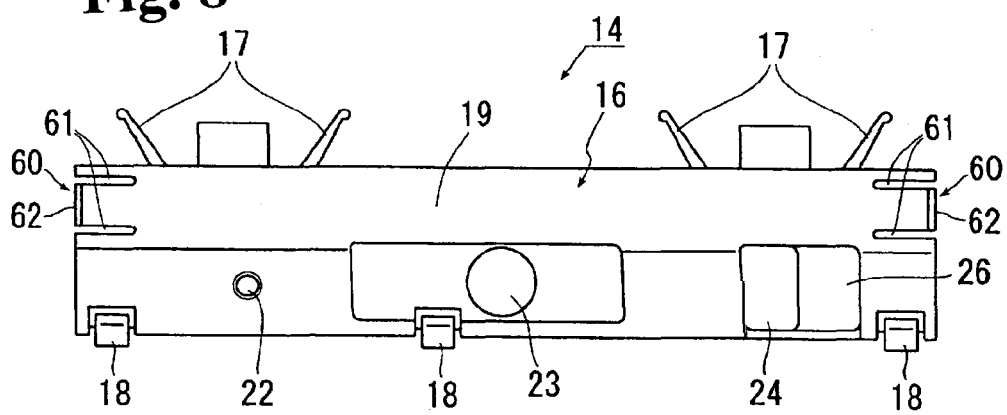
FIG. 8 is a plan view of a clip in the embodiment.

The main clip body 16 is provided with a screw hole 22, a through hole 23, and an insertion hole 24 disposed in that order from one longitudinal end (left side in FIG. 8) to the other end (right side in FIG. 8). The screw hole 22 is provided to receive a screw 25 (see FIGS. 6 and 7) to secure the bracket 15, and the screw hole 22 is formed on one longitudinal side of the main clip body 16. The through hole 23 is formed substantially in the center of the main clip body 16 and vertically extends through the main clip body 16. The insertion hole 24 is formed on the other longitudinal side of the main clip body 16, and also vertically extends through the main clip body 16. The opening of the insertion hole 24 on the side of the upper surface 19 of the main clip body 16 is expanded toward that longitudinal end to form a stepped surface 26 in the insertion hole 24.

As shown in FIGS. 1, 5, 7, 8, 10, and 24, the main clip body 16 is also provided with flexible tabs 60 at both longitudinal ends. Each flexible tab 60 is made by forming slits 61 in parallel at each longitudinal end of the upper surface 19 and allowed to flex by utilizing the inner space of the main clip body 16 at that end. A projection 62 is formed on the upper surface of the tip of each flexible tab 60 across the width thereof so as to slightly project upwardly above the upper surface. Thus, when installing the clip 14 (main clip body 16) to the molding 9, a thrusting force can be generated by pressing the projections 62 of the flexible tabs 60 against the inner surface of the molding 9 (flexing the flexible tabs 60). The thrusting force increases the sliding resistance of the clip 14 relative to the molding 9 (see FIG. 24).

The aforementioned two pairs of flexible pieces 17, as shown in FIGS. 8-10, are arranged at a predetermined spacing on one longitudinal side of the main clip body 16. Each pair of flexible pieces 17 is disposed so as to project outwardly from the side wall 20 on that longitudinal side of the main clip body 16, and the distance between the pair of flexible pieces 17 increases as they become more distant from the side wall 20. Thus, the pair of flexible pieces 17 can expand and contract by flexing themselves in the width direction of the main clip body 16.

The aforementioned plurality of engaging hooked tabs 18, as shown in FIGS. 8-10, are arranged at a predetermined spacing on the other widthwise side of the main clip body 16. Each engaging hooked tab 18 expands and contracts in the width direction of the main clip body 16 (rocks about its base), and has a hook 18a disposed at the tip thereof to engage the engaging end 13 of the molding 9.

The aforementioned bracket 15, as shown in FIGS. 5-7, includes a main bracket body 27 (a main second part body). The main bracket body 27 is made of a metal strip that extends substantially straight, and the length thereof is longer than the length of the main clip body 16 of the mounting unit 7 in which the bracket 15 is used. The main bracket body 27 is provided with an insertion section 29, a mounting section 30 for the member that will be subsequently attached, and a screw hole 31 disposed in that order from one end (right end in FIG. 6) to the other end (left end in FIG. 6). Considering the insertion into the insertion hole 24 and the engagement with the stepped surface 26 of the main clip body 16, the insertion section 29 is provided with an insertion end 32 that engages the stepped surface 26 of the main clip body 16 and a stopper 33 that raises the insertion end 32 and abuts against the inner peripheral edge of the insertion hole 24 on the lengthwise end of the main bracket body 27. The mounting section 30 for a member that will subsequently be attached in this embodiment is formed by integrating a metal tube 34 with female thread 35 tapped therein to the main bracket body 27.

When the insertion end of the main bracket body 27 is inserted into the insertion hole 24 and the main bracket body 27 is laid below the main clip body 16, the tube 34 enters through the through hole 23 of the main clip body 16 and slightly projects from the upper surface 19 of the main clip body 16. As a member that can be subsequently mounted utilizing the mounting section 30, an exterior accessory of various types can be accommodated as long as the accessory can mate with the female thread 35. In this embodiment, an accessory for holding luggage, such as a roof carrier (upon which a load is applied), is anticipated. The screw hole 31 is utilized to allow the screw 25 to pass through when screwing the screw 25 into the screw hole 22 of the aforementioned main clip body 16. The screw hole 31 is aligned with the screw hole 22 of the main clip body 16 when the insertion end of the main bracket body 27 is inserted into the insertion hole 24 and the main clip body 16 is laid over the main bracket body 27.

The aforementioned screws 28 in this embodiment comprise two bolts. Each screw 28 is integrated with the main bracket body 27 so as to project from the main bracket body 27 in the direction opposite to the aforementioned tube 34 and to be integrated with the aforementioned clip 14 via the bracket 15. One of the screws 28 is positioned between one end of the main bracket body 27 and the tube 34, and the other screw 28 is positioned at the other end of the main bracket body 27.

The aforementioned clip 14 and bracket 15 are integrated as shown in FIGS. 5-7. This integration is achieved by inserting one end of the bracket 15 (main bracket body 27) into the insertion hole 24 of the main clip body 16, engaging the insertion end 32 with the stepped surface 26 of the main clip body 16, and abutting the stopper 33 against the inner peripheral edge of the insertion hole 24, while screwing the screw 25 into screw hole 22 via the through hole 31 of the bracket 15.

The bracket 15, therefore, is held along the lower surface of the clip 14 while extending one portion thereof (the other lengthwise end) from the clip 14. At this time, portions of the inner spaces of the clip 14 are utilized to place the bracket 15 and the head of the screw 25, and thus the lower surface of the unit integrating the clip 14 and the bracket 15 is flat, despite the layering (see FIG. 6).

Figure 13:
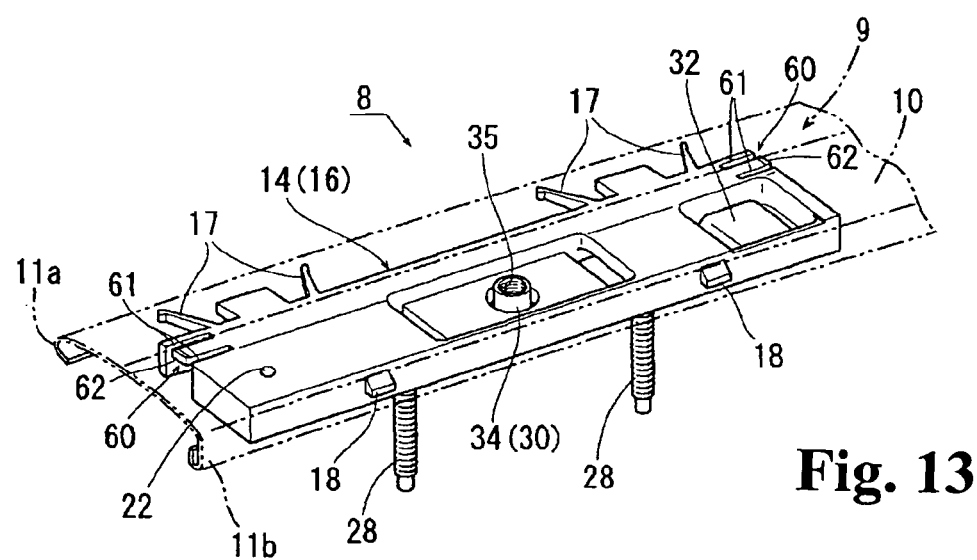
FIG. 13 is a perspective view showing the other of the mounting units in the embodiment.
Figure 14:
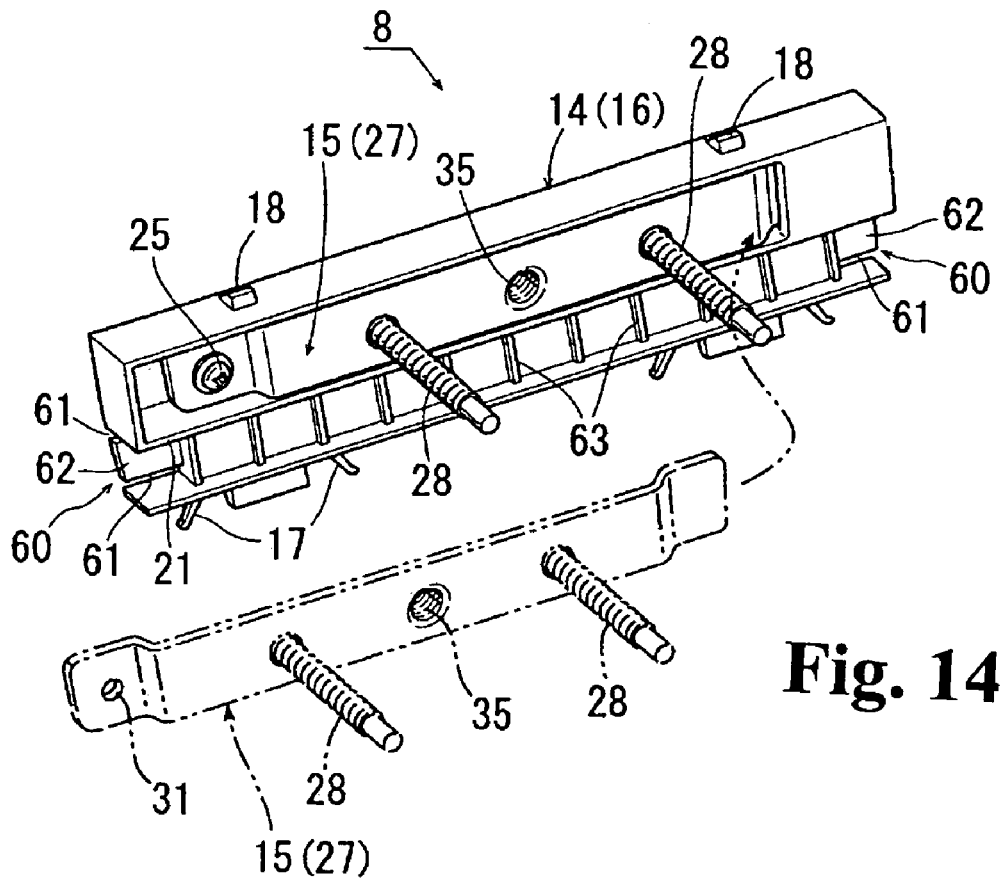
FIG. 14 is a perspective view showing the lower surface of the mounting unit.
Figure 15:
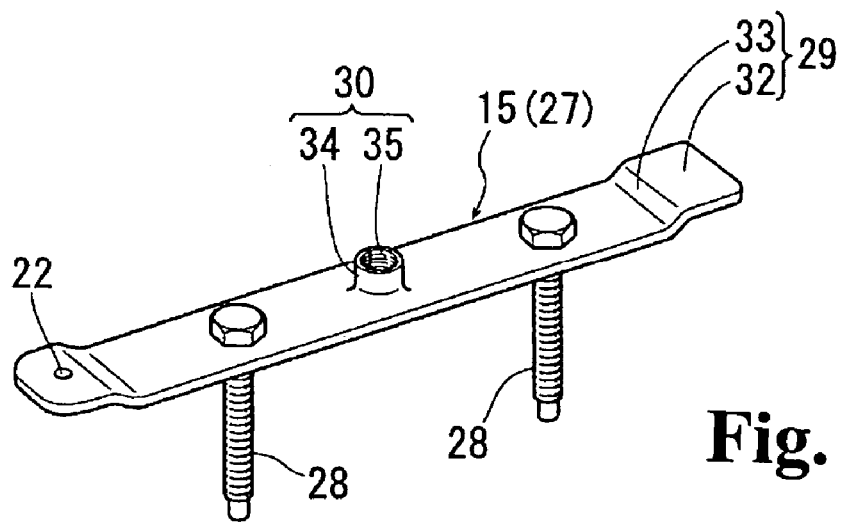
FIG. 15 is a perspective view of the bracket used in the mounting unit.

The other mounting unit 8, as shown in FIGS. 13-15, is constructed basically same as the aforementioned mounting unit 7, except that the bracket 15 is shorter and does not extend out from the clip 14, and one of the screws 28 has a different position. Thus, the constituent elements of the mounting unit 8 that are the same as those of the mounting unit 7 are denoted with the same reference numerals, for which explanation is omitted.

Figure 11:
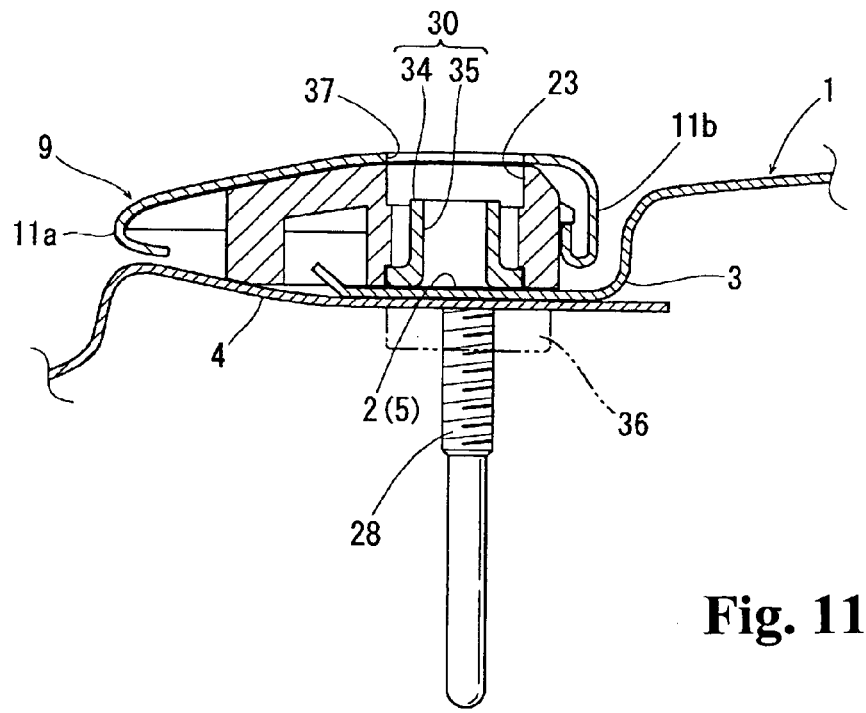
FIG. 11 is an enlarged sectional view at line 11-11 indicated in FIG. 3.

As shown in FIGS. 1, 3, and 11, the mounting unit 7 is fastened to the roof channel bottom 5 at the installation location S1, and the mounting unit 8 is fastened to the roof channel bottom 5 at the installation location S2. Each mounting unit 7(8) is fastened by inserting the two bolts 28 of the bracket of the mounting unit 7(8) into the two through holes 6 formed at the installation location S1 (S2) in the roof channel bottom 5, and screwing nuts 36 onto the bolts 28 from the inner surface side of the roof 1.

The aforementioned molding 9 is attached to each mounting unit 7(8) using the clip 14 of the mounting unit 7(8) to cover the upper opening of the roof channel 2. This installation is carried out by fitting each clip 14 into the molding 9; the two pairs of flexible pieces 17 of each clip 14 abut against the curved section 11a in a slightly flexed condition; and the plurality of engaging hooked tabs 18 abut against the curved section 11b while engaging their hooks 18a with the engaging end 13 of the curved section 11b. In this case, each mounting unit 7(8) initially holds the molding 9 and becomes slidable relative to the molding 9, but after the molding 9 is properly installed to the roof 1, the movement of the molding 9 relative to the mounting unit 7(8) is restrained by restraining means not shown in the figures.

Figure 12:
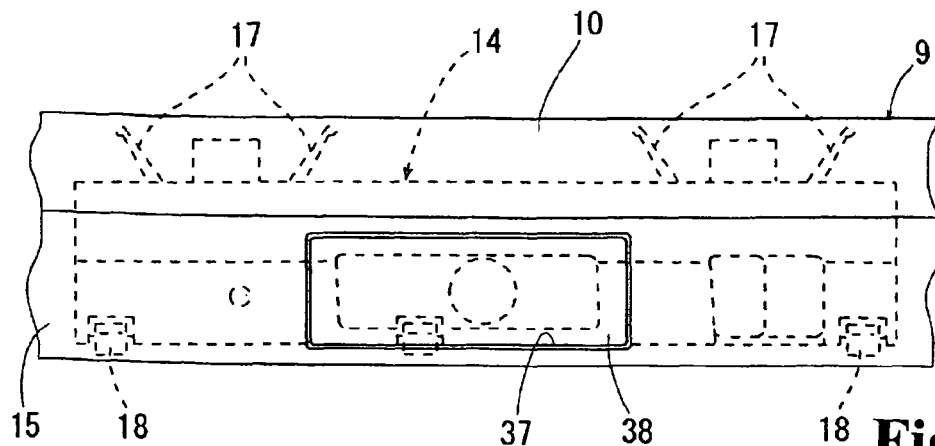
FIG. 12 is a plan view showing the condition of the molding in the vicinity of the mounting unit.

The molding 9, as shown in FIG. 12, has an opening 37 formed in correspondence with the position of each mounting unit 7(8). The opening 37 is set so as to expose the mounting section 30 for subsequently installing a member when the molding 9 is properly installed to the roof 1, and is covered with a cap 38 when the mounting section 30 is not in use (not shown in FIG. 11).

Next, the steps for installing the molding 9 to the roof 1 using the mounting unit 7(8) (how the mounting unit 7(8) is used) will be explained.

First, the mounting unit 7(8) is attached to the molding 9 in the predetermined installation location S1 (S2). The clip 14 included in the mounting unit 7(8) is utilized in the installation. While holding the clip 14 so that the upper face 19 faces the inner surface of the molding 9, one longitudinal side of the clip 14 is inserted into the channel 12 located on one longitudinal side of the molding 9, and in this condition, the other longitudinal side of the clip 14 is pushed into the molding 9. This action flexes the individual engaging hooked tabs 18 and pairs of flexible pieces 17 to allow the clip 14 to enter the molding 9. Subsequently, the engaging hooked tabs 18 and the pairs of flexible pieces 17 engage the pair of curved sections 11a and 11b of the molding 9. As a result, the clip 14 is prevented from separating from the molding 9, and becomes slidable relative to the molding 9 under appropriate sliding resistance based on the thrusting force generated by the flexible tabs 60 (see FIG. 24). To remove the mounting unit 7(8) from the molding, the mounting unit 7(8) is pulled out of the end of the molding 9 by sliding the clip 14 against the molding 9.

As shown in FIG. 1, in the condition wherein the molding 9 is attached, the screws 28 of the bracket 15 of the mounting unit 7(8) are entered into the respective through holes 6 of the roof channel bottom 5. At this time, since the clip 14 of the unit 7(8) is slidable against the molding 9, the mounting unit 7(8) is slid for appropriate positioning.

The nuts 36 are then screwed onto the screws 28 of the mounting unit 7(8) from the inner side of the roof 1 by utilizing the bracket 15 as a facing plate (washer) to thereby secure the mounting unit 7(8) to the roof 1. As a consequence, the molding 9 is mounted to the roof 1 via the mounting unit 7(8) and covers the opening of the roof channel 2.

Accordingly, everything that is to be attached to the roof 1 can be assembled as a unit prior to installation thereto by attaching the molding 9 to the mounting unit 7(8) in advance. The installation only requires screw-tightening of the nuts on the screws 28 from the inner side of the roof 1 once the screws 28 of the mounting unit 7 (8) are entered into the through holes 6 of the roof 1. This reduces the assembly steps required to install the molding 9 or increases the efficiency in the installation work.

After installing the molding 9 on the roof 1 in this manner, a member to be subsequently attached, such as a roof carrier for skis, luggage and the like, can be attached to the roof 1 utilizing the mounting unit 7 (8). In this case, the caps 38 of the molding 9 are removed to expose the mounting sections 30. The roof carrier (the mounting sections thereof) is then attached by utilizing the female threads 35 in the tubes 34 that constitute the mounting sections 30. At this time, the roof carrier is received by the mounting unit 7(8), not the molding 9, and thus deformation of the molding 9 can be prevented. In addition, since the clip 14 and the bracket 15, which constitute the mounting unit 7(8), are formed as a plate and a strip, respectively, the sections subjected to the roof carrier are given enough thickness and are reinforced, thereby adequately withstanding the load applied by the roof carrier. In this case, the reinforcing effect is further increased by the use of metal for the bracket 15.

FIGS. 16-23 and 25-28 show another embodiment of the present invention. In this embodiment, the constituent elements that are the same as the previous embodiment are denoted with the same numerical references, for which explanation is omitted.

Figure 16:
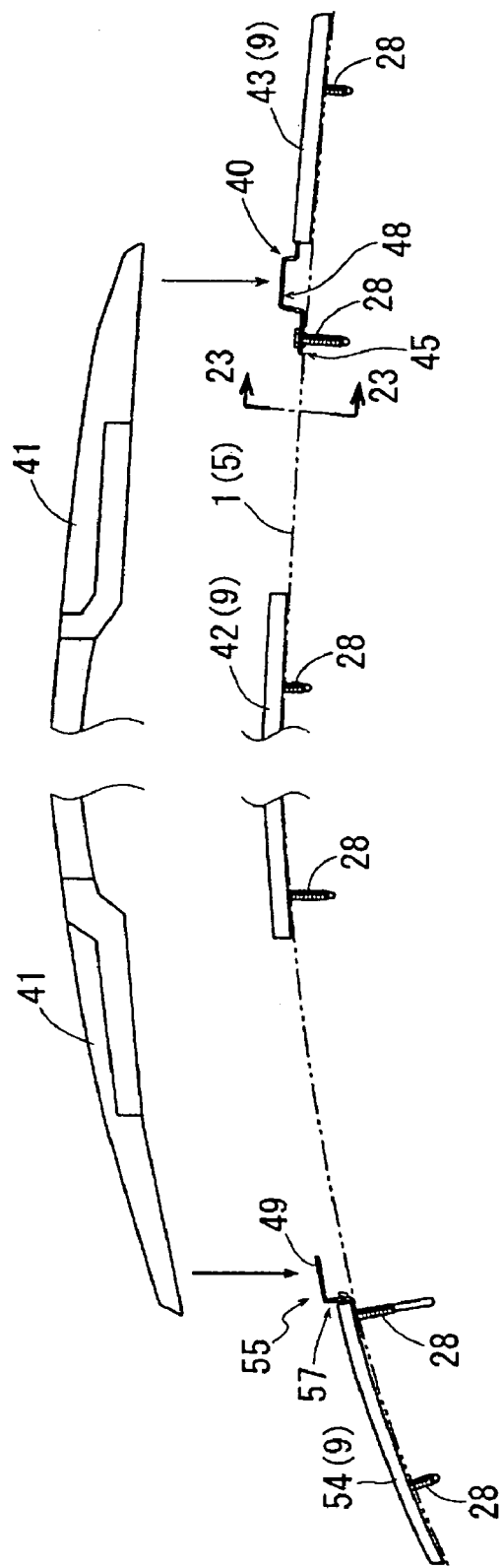
FIG. 16 is a diagram that explains another embodiment of the present invention.

As shown in FIG. 16, this embodiment shows a case wherein the molding 9 and the roof rack 41 are mounted to the roof 1 (roof channel bottom 5).

In this embodiment, the molding 9 is divided into a front molding 54, a middle molding 42, and a rear molding 43, and a predetermined space is provided between the front molding 54 and the middle molding 42, and between the middle molding 42 and the rear molding 43. The middle molding 43 is attached to the roof 1 using the mounting unit 8 in the previous embodiment, while the front molding 54 is attached, in the rear end section thereof, to the roof 1 using a mounting unit 55, and the rear molding 43 is attached, in the front end section thereof, to the roof 1 using a mounting unit 40.

Figure 17:
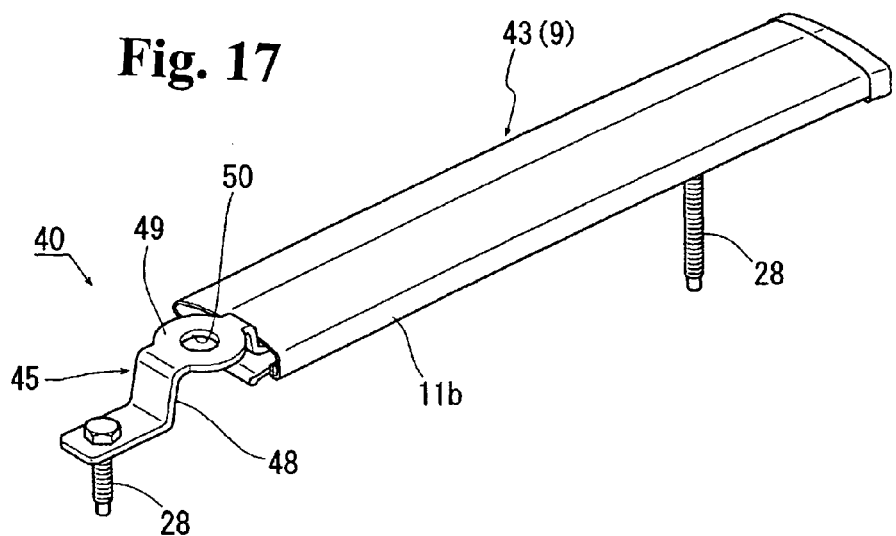
FIG. 17 is a perspective view showing the mounting unit attached to the rear molding in the embodiment.
Figure 18:
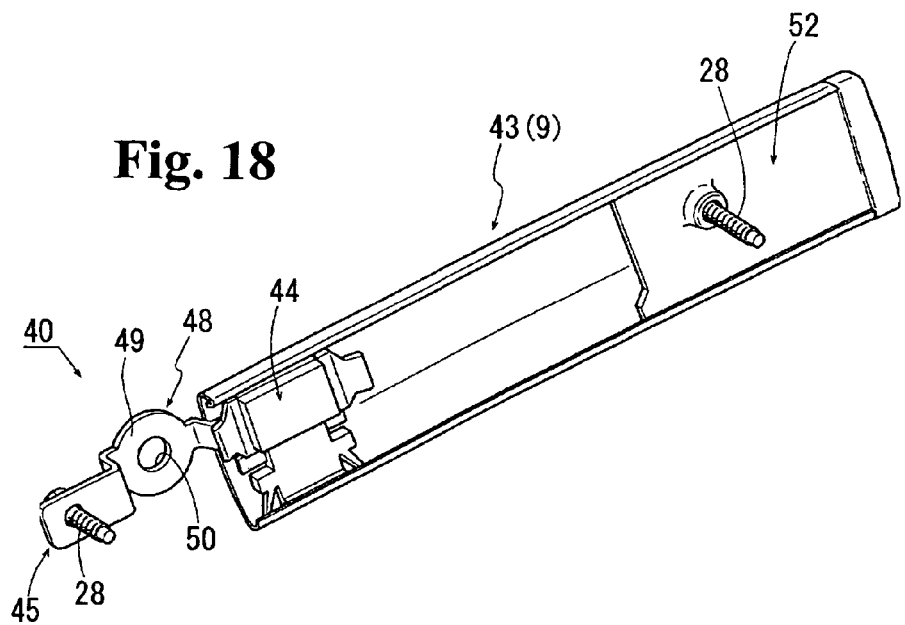
FIG. 18 is a perspective view showing the back side of the rear molding.
Figure 19:
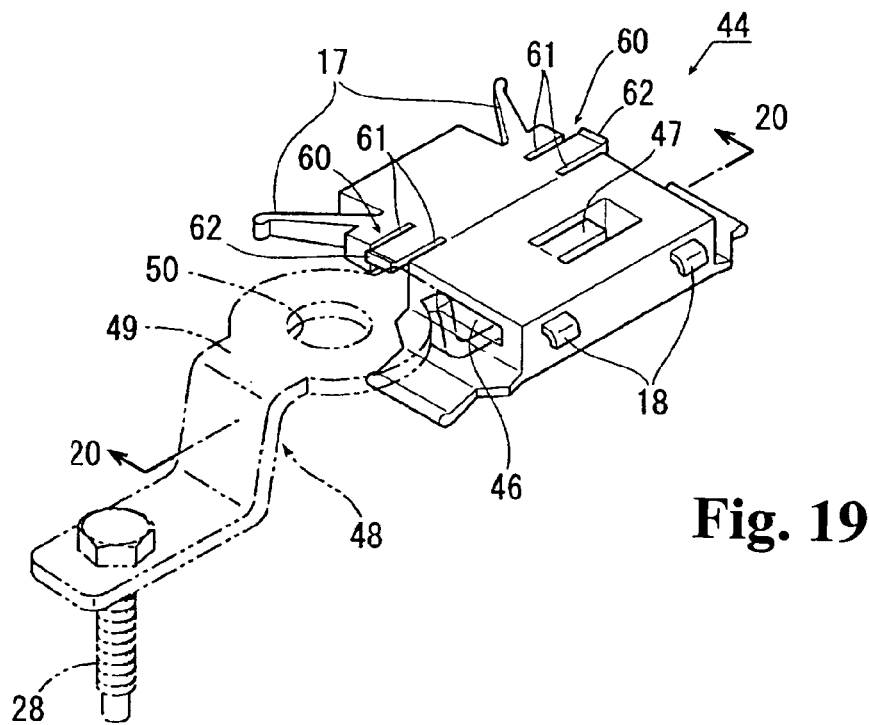
FIG. 19 is a perspective view of the clip of the mounting unit for the rear molding.

The aforementioned mounting unit 40, as shown in FIGS. 17 and 18, is composed of a synthetic resin clip 44 (a first part) to be fitted to the front end of the rear molding 43, a metal bracket 45 (a second part) to be detachably attached to the clip 44 and extending outwardly in the direction in which the rear molding 43 extends, and a screw 28 integrated to the bracket 45. The clip 44, as shown in FIG. 19, is constructed as one half of the clip 14 in the previous embodiment. Both clips 44 and 14 are essentially constructed in the same manner with respect to how they fit, slide, and generate a thrusting force (flexible tab 60) relative to the molding (the components that are the same as those in the previous embodiment are denoted with the same reference numerals). The clip 44, as shown in FIGS. 19 and 20, is provided with an insertion hole 46 toward which an engaging tab 47 faces.

Figure 21:
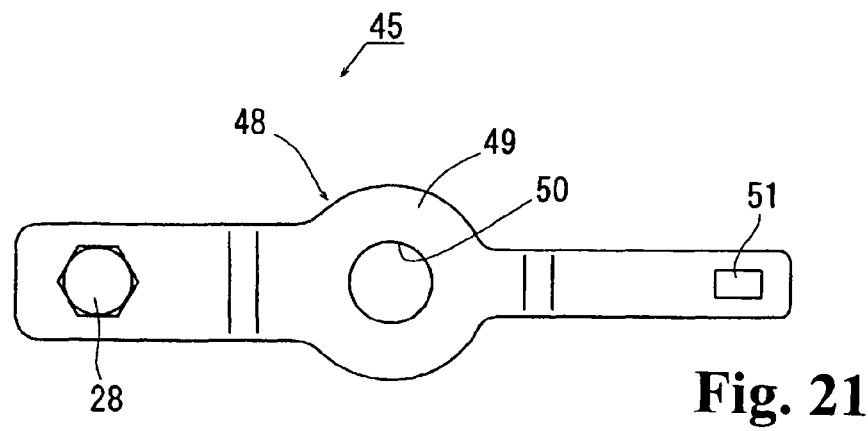
FIG. 21 is a plan view of the bracket of the mounting unit for the rear molding.
Figure 22:
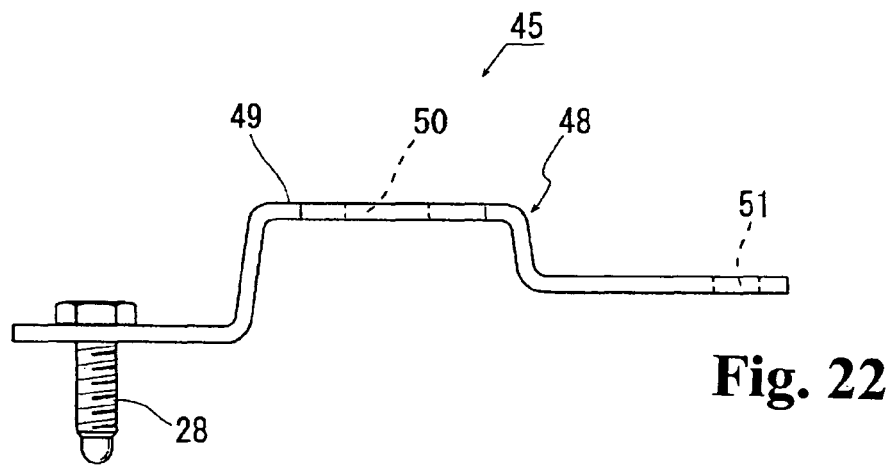
FIG. 22 is a front view of the bracket of the mounting unit for the rear molding.

The bracket 45, as shown in FIGS. 21 and 22, is fabricated by bending a metal strip so that the lengthwise middle section protrudes above the two ends to thereby form a bulged section 48 in the middle. A flat seat 49 is formed in the upper section of the bulged section 48 so that the mounting end of the roof rack 41 can be mounted thereon. A mounting hole 50 for mounting the roof rack 41 is formed in the seat 49. One end of the bracket 45 is given the width to fit into the insertion hole 46 of the clip 44, and an engaging hole 51 to engaging the engaging tab 47 of the clip 44 is formed at that end. The screw 28 is constructed by integrally attaching a bolt to the other end of the bracket 45. The screw 28 projects in the opposite direction of the direction in which the mid section of the bracket 45 bulges out.

Figure 20:
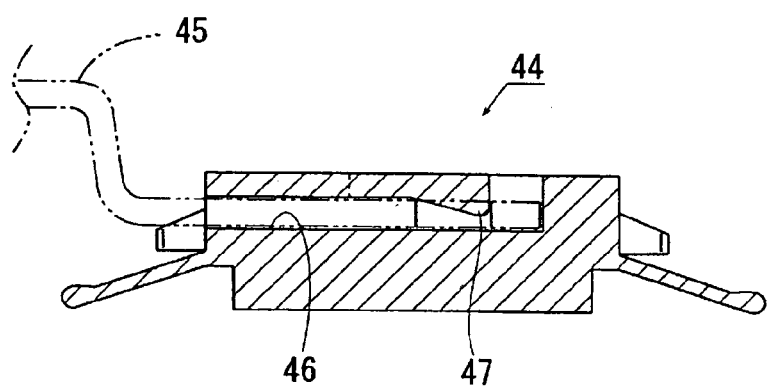
FIG. 20 is an enlarged sectional view at line 20-20 indicated in FIG. 19.

The clip 44 and the bracket 45 are integrated as shown in FIGS. 19 and 20. This integration is achieved by inserting one end of the bracket 45 into the insertion hole 46 of the clip 44 so that the bulged section 48 faces up, and engaging the engaging tab 47 of the clip 44 with the engaging hole 51 of the bracket 45. The mounting unit 40 is constructed in this manner.

The aforementioned mounting unit 55, as shown in FIGS. 16 and 25-28, is composed of a synthetic resin clip 56 (a first part) to be fitted to the rear end of the front molding 54, a metal bracket 57 (a second part) to be detachably attached to the clip 56 and extending outwardly in the direction in which the front molding 54 extends, and a screw 28 integrated into the bracket 56.

Figure 27:
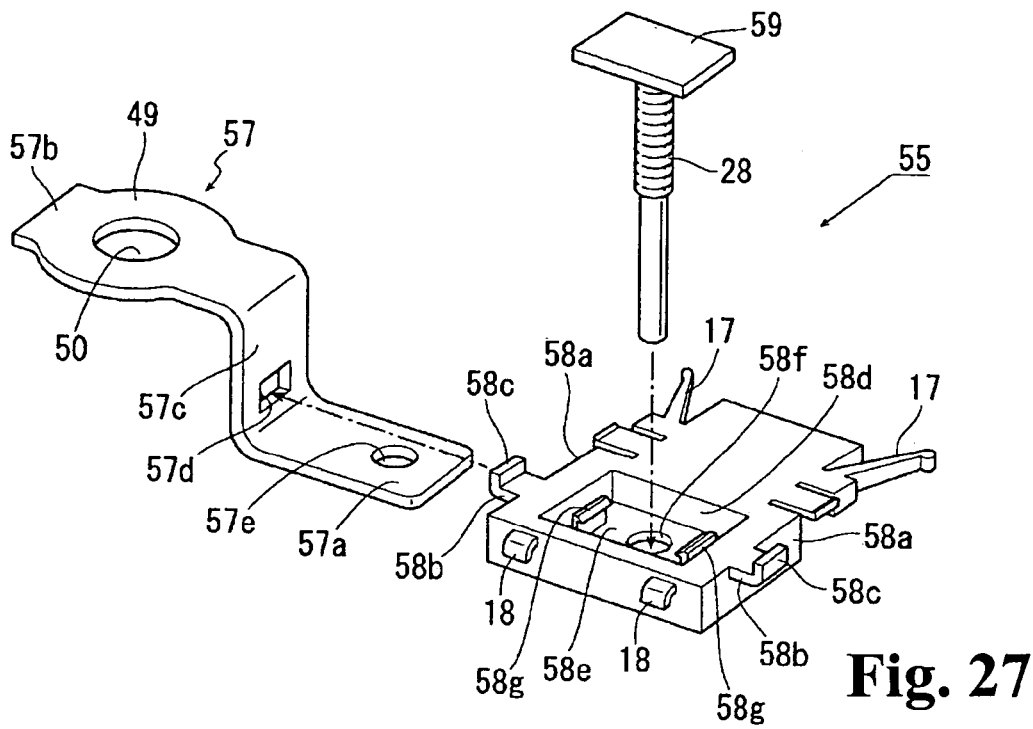
FIG. 27 is a diagram that explains the assembly of the mounting unit for the front molding.
Figure 28:
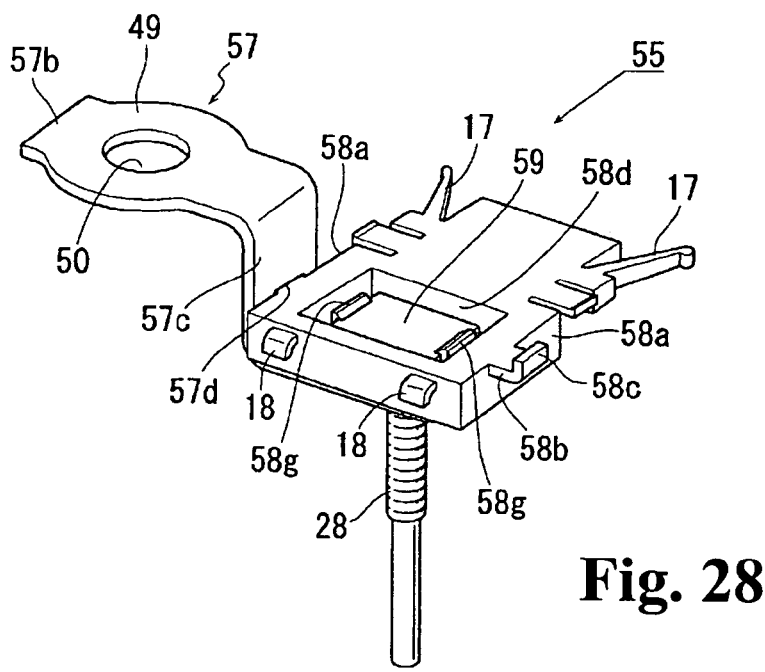
FIG. 28 is a perspective view showing the mounting unit for the front molding.

The clip 56 is constructed in the same way as the aforementioned clip 44 with respect to how it fits to the front molding 54, but is constructed slightly differently with respect to how it holds the bracket 57 and the screw 28. The clip 56, as shown in FIGS. 27 and 28, is provided with bracket mounting sections 58b integrally disposed in the side surfaces 58a of the main clip body 58 disposed between the flexible pieces 17 and the engaging hooked tabs 18. Each bracket mounting section 58b extends from the main clip body 58, and a hook 58c to prevent from slipping is formed at the tip thereof. A recess 58d, rectangular in shape in a plan view, is formed in the main clip body 58, and a through hole 58f and a pair of engaging hooks 58g are disposed in the bottom 58e of the recess 58d. The through hole 58f is formed to pass through the front surface (recess bottom 58e) and the back surface of the main clip body 58, and the pair of engaging hooks 58g is disposed to sandwich the through hole 58f.

The bracket 57 is fabricated by bending a metal strip so that one end 57a and the other end 57b are formed at two levels with a riser 57c integrally interposed between the ends 57a and 57b. A mounting hole 57d is formed in the riser 57c of the bracket 57 into which the aforementioned bracket mounting section 58b is inserted. In this case, after inserting the tip of the hook 58c of the aforementioned bracket mounting section 58b into the mounting hole 57d, the bracket mounting section 58b is inserted into place by turning. Once inserted in place, the bracket 57 is not removed easily from the clip 56 because of the engagement between the hook 58c of the bracket mounting section 58b and the peripheral edge of the mounting hole 57d (mounting of the bracket).

In this case, the bracket 57 is attached to one of the pair of bracket mounting sections 58b selected according to the mode of application. One end 57a of the bracket 57 is placed on the back side of the clip 56 when mounted in the manner described above. A through hole 57e is formed on that end of the bracket 57, and the through hole 57e is aligned with the through hole 58f of the clip 56 when the riser 57c of the bracket 57 abuts against the side surface 58a of the clip 56, both through holes 57e and 58f having the function as a through hole for a bolt. The other end 57b of the bracket 57, as described earlier, is positioned above the surface of the main clip body 58 to extend away from the clip 56 when the bracket 57 is attached to the mounting section 58b. That end of the bracket 57 forms a flat seat 49, which is supported at one side, and a mounting hole 50 for mounting the roof rack 41 is formed in the seat 49.

The screw 28 is supported by the clip 56 of the mounting unit 55. The screw 28 has a head 59, which is rectangular in a plan view, that is held between the engaging pieces 58g in the recess 58d when the screw is inserted into said through holes 58f and 57a and pushed into the space between the pair of engaging pieces 58g in the recess 58d. This integrates the screw 28 with the clip 56, prevents the end 57a of the bracket 57 from turning by using the mounting section 58b as a fulcrum, and allows for the utilization of the bracket 57 as a washer for the screw 28. In this case, moreover, the rotation of the screw 28 about its axis is prevented, as the head 59 engages the inner walls of the recess 58d when the screw 28 rotates slightly, thereby restricting further rotation.

Such mounting units 40 and 55 are used as follows. Regarding the mounting unit 40, as shown in FIGS. 17 and 18, the clip 44 is fitted into the front section of the rear molding 43. This fitting is conducted in the same manner as that in the previous embodiment, and, as a result, the bulged section 48 of the bracket 45 and the screw 28 are positioned outside of the front end of the rear molding 43.

Figure 23:
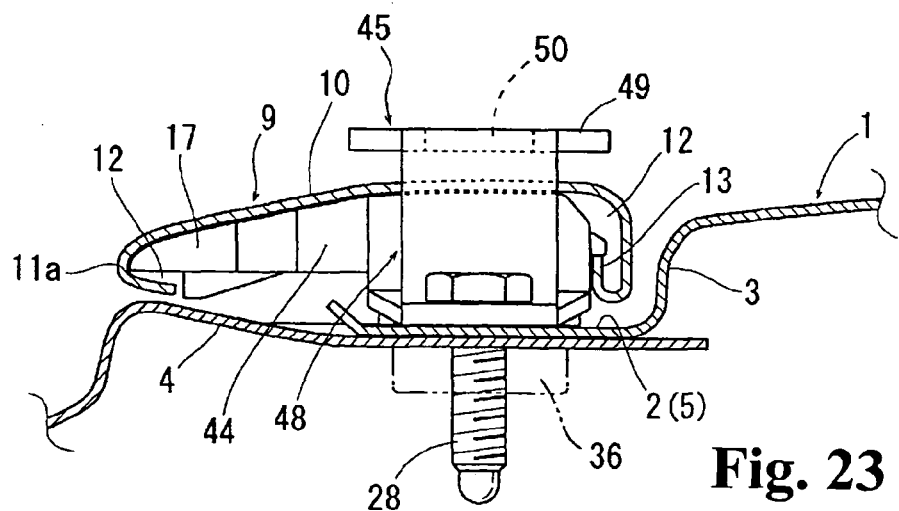
FIG. 23 is an enlarged sectional view at line 23-23 indicated in FIG. 16.
Figure 24:
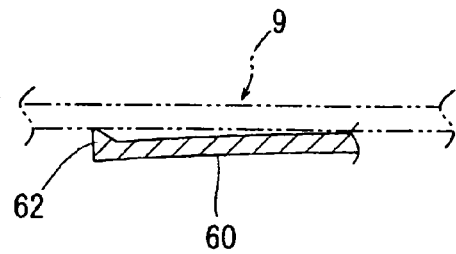
FIG. 24 is an enlarged sectional view at line 24-24 indicated in FIG. 1.

In addition, a separate mounting unit 52 is installed in the rear side of the rear molding 43 before or after the installation of the mounting unit 40, and the mounting unit 52 also provides a screw 28 in the rear side of the rear molding (see FIGS. 17 and 18). As shown in FIG. 23, the screws 28 of the mounting units 40 and 52, to which the rear molding 43 is fastened, are inserted into the through holes 6 formed in advance in the predetermined locations of the roof groove bottom 5, and nuts 36 are screwed onto these screws 28 from the inner side of the roof 1 and using the other end of the bracket 45 as a washer. When fastened to the predetermined location, the rear molding 43 covers the upper opening of the roof channel 2.

Figure 25:
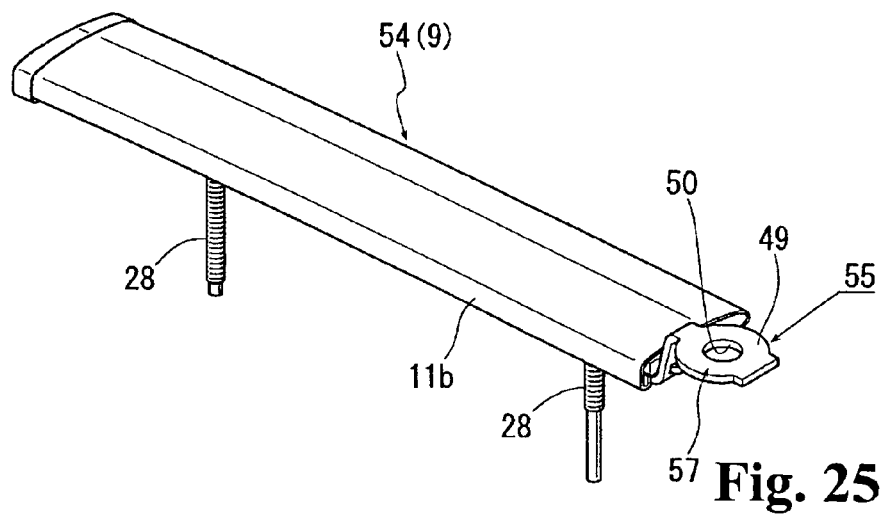
FIG. 25 is a perspective view of the mounting unit attached to the front molding.
Figure 26:
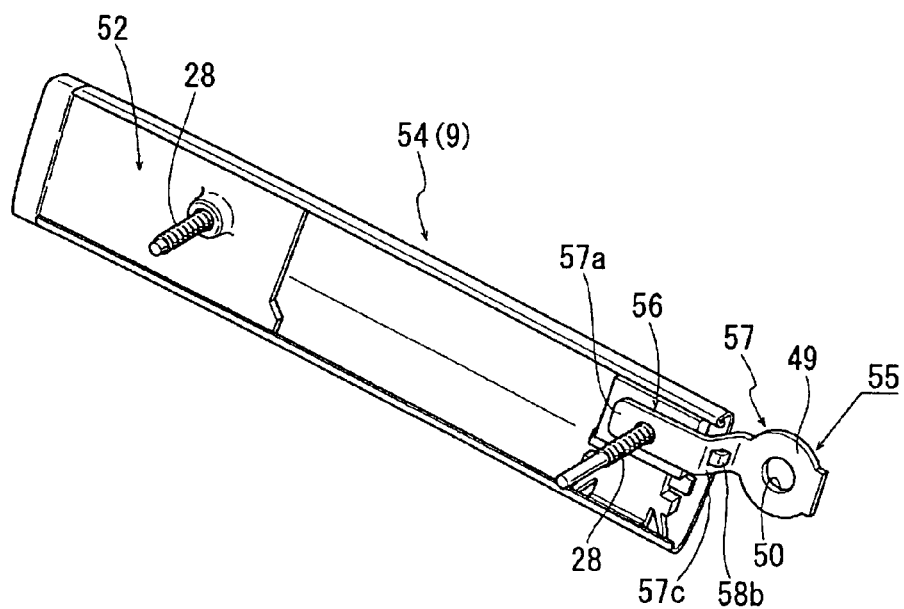
FIG. 26 is a perspective view showing the back side of the front molding.

The mounting unit 55, as shown in FIGS. 25 and 26, is attached to the rear end of the front molding 54 in the same manner as for the mounting unit 40. As a result, the seat 49 of the bracket 57 is positioned outside of the rear end of the front molding 54 (see FIG. 16). The front molding 54 is also provided with a separate mounting unit 52, which provides a screw 28 in the front side of the front molding 54 (see FIGS. 25 and 26).

The screws 28 of the mounting units 55 and 52, to which the front molding 54 is fastened, are inserted into the through holes 6 formed in advance in the predetermined locations of the roof groove bottom 5, and nuts 36 are screwed onto these screws 28 from the inner side of the roof 1 and using the bracket 57 as a washer. When fastened to the predetermined location, the front molding 54 covers the upper opening of the roof channel 2.

As shown in FIG. 16, the rear and front mounting ends of the roof rack 41 are placed on the seats 49 of the mounting units 40 and 55, respectively, and the mounting ends of the roof rack 41 are respectively fastened to the seats 49 using fixtures (not shown).

In this embodiment, the mounting unit 55 is provided with a bracket 57 for mounting a roof rack 41 as an accessory to be subsequently installed. When there is no accessory to be subsequently installed, the mounting unit 55 may be constructed only with the clip 56 (first part) and the screw 28 for use as the mounting unit for the front, middle, and rear moldings 54, 42, and 43.

The objects of the present invention are not limited to those specified herein, but include the provision of an exterior accessory mounting unit capable of accommodating any practically preferable or advantageous accessory to be mounted.

The disclosure of Japanese Patent Application No. 2004-258271 filed on Sep. 6, 2004 is incorporated herein.

While the invention has been explained with reference to the specific embodiments of the invention, the explanation is illustrative, and the invention is limited only by the appended claims.

What is claimed is:

1. An exterior member mounting unit for installing an exterior member having a top plate and a pair of curved sections on two sides thereof, to a roof channel of a vehicle, comprising:
   a first part for detachably supporting the exterior member so that an upper surface thereof is covered by the exterior member and said first part is slidable relative to said exterior member in a longitudinal direction thereof, said first part having a main first part body in a plate form, and a pair of expandable engaging means on two sides thereof for engaging said pair of curved sections,
   a second part detachably held by the first part and having a main second part body as a strip extending along a lower surface of said first part, and
   a screw member for attaching the exterior member to the roof channel while utilizing the second part detachably supported by the first part as a seating plate, said screw member extending downwardly from a lower surface of said main second part body,
   wherein said main first part body is provided with an insertion hole,
   said main second part body has one end supported by said insertion hole, and the other end fastened by the lower surface of said main first part body, and
   the pair of expandable engaging means is flexible pieces extending laterally outwardly from one side of the main first part body, and a tab formed on the main first part body at a side opposite to the pair of flexible pieces.

2. An exterior member mounting unit as claimed in claim 1, wherein said second part is provided with a mounting section for mounting a member that is to be fastened subsequently between one section of said second part and said screw member.

3. An exterior member mounting unit as claimed in claim 2, wherein said first part is formed with synthetic resin and said second part is formed with metal.

4. An exterior member mounting unit as claimed in claim 1, wherein said first part is formed with synthetic resin and said second part is formed with metal.

5. An exterior member mounting unit for installing an exterior member having a top plate and a pair of curved sections on two sides thereof, to a roof channel of a vehicle, comprising:
   a first part for detachably supporting the exterior member so that an upper surface thereof is covered by the exterior member and said first part is slidable relative to said exterior member in a longitudinal direction thereof, said first part having a main first part body in a plate form, and a pair of expandable engaging means on two sides thereof for engaging said pair of curved sections,
   a second part detachably held by the first part and having a main second part body as a strip extending along a lower surface of said first part, and
   a screw member for attaching the exterior member to the roof channel while utilizing the second part detachably supported by the first part as a seating plate, said screw member extending downwardly from a lower surface of said main second part body,
   wherein said first part is provided with an insertion hole,
   said second part includes one section mating with and situated in said insertion hole and the other section extending away from said first part,
   said screw is integrally disposed in the other section of the second part, and
   the pair of expandable engaging means is flexible pieces extending laterally outwardly from one side of the main first part body, and a tab formed on the main first part body at a side opposite to the pair of flexible pieces.

6. An exterior member mounting unit as claimed in claim 5, wherein said second part is provided with a mounting section for mounting a member that is to be fastened subsequently between one section of said second part and said screw member.

7. An exterior member mounting unit as claimed in claim 6, wherein said first part is formed with synthetic resin and said second part is formed with metal.

8. An exterior member mounting unit as claimed in claim 5, wherein said first part is formed with synthetic resin and said second part is formed with metal.

9. An exterior member mounting unit for installing an exterior member having a top plate and a pair of curved sections on two sides thereof, to a roof channel of a vehicle, comprising:
   a first part for detachably supporting the exterior member so that an upper surface thereof is covered by the exterior member and said first part is slidable relative to said exterior member in a longitudinal direction thereof, said first part having a main first part body in a plate form, and a pair of expandable engaging means on two sides thereof for engaging said pair of curved sections,
   a second part detachably held by the first part and having a main second part body as a strip extending along a lower surface of said first part, and
   a screw member for attaching the exterior member to the roof channel while utilizing the second part detachably supported by the first part as a seating plate, said screw member extending downwardly from a lower surface of said main second part body,
   wherein said main first part body is provided with an opening to expose one portion of said main second part body,
   said main second part body is provided with a mounting section disposed so as to face said opening for mounting a member that is to be fastened subsequently, and
   the pair of expandable engaging means is flexible pieces extending laterally outwardly from one side of the main first part body, and a tab formed on the main first part body at a side opposite to the pair of flexible pieces.

10. An exterior member mounting unit as claimed in claim 9, wherein said first part is formed with synthetic resin and said second part is formed with metal.

* * * * *